(12) United States Patent
Men (10) Patent No.: US 10,307,840 B1
(45) Date of Patent: Jun. 4, 2019

(54) DOUBLE-SIDED INDEXABLE INSERT HAVING TAPERED WAIST FOR HIGH-FEED MILLING AND DRILLING

(71) Applicant: Iscar, Ltd., Tefen (IL)

(72) Inventor: Yuri Men, Haifa (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/824,094

(22) Filed: Nov. 28, 2017

(51) Int. Cl.
  *B23C 5/20* (2006.01)
  *B23B 51/04* (2006.01)
  *B23C 5/02* (2006.01)

(52) U.S. Cl.
  CPC ............... *B23C 5/20* (2013.01); *B23C 5/02* (2013.01); *B23B 51/048* (2013.01); *B23C 2200/086* (2013.01); *B23C 2200/123* (2013.01); *B23C 2200/205* (2013.01)

(58) Field of Classification Search
  CPC ....... B23C 5/20; B23C 5/02; B23C 2200/086; B23C 2200/123; B23C 2200/205
  See application file for complete search history.

(56) References Cited

U.S. PATENT DOCUMENTS

| | | | | |
|---|---|---|---|---|
| 4,648,760 A | * | 3/1987 | Karlsson | B23B 27/141 407/113 |
| 5,622,461 A | * | 4/1997 | Tukala | B23B 51/048 407/113 |
| 5,709,509 A | * | 1/1998 | Wegener | B23C 5/2213 407/114 |
| 5,758,994 A | * | 6/1998 | Hintze | B23B 27/141 407/113 |
| 6,238,146 B1 | * | 5/2001 | Satran | B23B 27/1614 407/113 |

(Continued)

FOREIGN PATENT DOCUMENTS

| | | | | |
|---|---|---|---|---|
| JP | 06015517 A | * | 1/1994 | ............. B23C 5/006 |
| JP | 2014198375 A | * | 10/2014 | ............. B23C 5/207 |
| JP | 2016144831 A | * | 8/2016 | ............... B23C 5/06 |

OTHER PUBLICATIONS

International Search Report dated Feb. 21, 2019, issued in PCT counterpart application (No. PCT/IL2018/051152).

(Continued)

*Primary Examiner* — Sara Addisu
(74) *Attorney, Agent, or Firm* — Womble Bond Dickinson (US) LLP (57) ABSTRACT

An indexable milling or drilling insert having a 180-degree rotational symmetry about each of the first, second and third axes (X, Y, Z) of a three-dimensional euclidean space. The insert has opposite first and second main surfaces and a peripheral surface extending therebetween. Each main surface has a main abutment surface and at least two rake surfaces. The insert has a through clamping bore which extends along the third axis and opens out to the main surfaces. The peripheral surface has two opposite front surfaces connected to two opposite side surfaces. Each front surface has a pair of outward abutment surfaces and each side surface has a pair of at least partially planar inward abutment surfaces. Each pair of outward abutment surfaces converge outwardly away from the third axis and each pair of inward abutment surfaces converge inwardly towards the third axis.

26 Claims, 6 Drawing Sheets

(56) References Cited

U.S. PATENT DOCUMENTS

| | | | | |
|---|---|---|---|---|
| 6,527,486 B2* | 3/2003 | Wiman | ................ | B23B 27/141 407/113 |
| 7,367,755 B2* | 5/2008 | Wurfels | ............. | B23B 27/1618 407/113 |
| 7,905,688 B2* | 3/2011 | Ertl | ........................ | B23C 5/10 407/113 |
| 8,475,089 B2* | 7/2013 | Kakai | .................... | B23C 5/109 407/103 |
| 8,696,263 B2 | 4/2014 | Saji | | |
| 8,950,984 B2 | 2/2015 | Choi et al. | | |
| 9,782,844 B2* | 10/2017 | Ogata | .................... | B23C 5/109 |
| 2001/0033779 A1 | 10/2001 | Wiman et al. | | |
| 2008/0138161 A1* | 6/2008 | Wermeister | ......... | B23B 27/1622 407/48 |
| 2011/0255924 A1* | 10/2011 | Choi | ...................... | B23C 5/202 407/42 |
| 2012/0009029 A1* | 1/2012 | Saji | ........................ | B23C 5/109 407/67 |
| 2012/0195700 A1* | 8/2012 | Chen | ........................ | B23C 5/06 407/40 |
| 2017/0225244 A1* | 8/2017 | Crespin | ..................... | B23C 5/20 |
| 2017/0341160 A1 | 11/2017 | Furucrona et al. | | |
| 2018/0036811 A1* | 2/2018 | Saji | ........................ | B23C 5/109 |

OTHER PUBLICATIONS

Written Opinion dated Feb. 21, 2019, issued in PCT counterpart application (No. PCT/IL2018/051152).

* cited by examiner

| | Current geometry as compared to Non Winged Insert | Prior art high feed Winged insert compared to Non winged insert | Prior art high feed Non winged |
|---|---|---|---|
| Max Cut depth | 33% increase | 17% increase | Reference depth |
| Max Tool Plunge depth | 66% increase | No increase | Reference depth |
| Max Tool Ramp Angle | 204% increase | 43% increase | Reference depth |

FIG.16

DOUBLE-SIDED INDEXABLE INSERT HAVING TAPERED WAIST FOR HIGH-FEED MILLING AND DRILLING

FIELD OF THE INVENTION

The subject matter of the present application relates to milling or drilling tools. Specifically, it relates to radial, double-sided indexable high-feed or drilling inserts which include a through clamping bore for securing the insert via a fastening member.

BACKGROUND OF THE INVENTION

U.S. Pat. No. 8,696,263 discloses a double sided indexable fast, or high-feed insert which includes four cutting portions. The insert has opposite main surfaces and a peripheral surface which extends therebetween. The peripheral surface includes exactly two large parallel side abutment surfaces located on opposite sides of the clamping bore. The insert also has two pairs of front abutment surfaces, each pair converging outwardly away from the clamping bore. Each cutting portion extends close to a maximum width of the insert defined by the side abutment surface. This so-called slim designed insert will be referred to herein as a "non-winged high-feed insert".

U.S. Pat. No. 8,950,984 discloses a similar double-sided indexable high-feed insert which, in the context of the current invention—has an improved design over the above-mentioned non-winged insert. Specifically, at the cutting portions the insert in U.S. Pat. No. 8,950,984 has extensions/wings, or enlarged cutting edge portions which protrude outwardly from the insert's sides, increasing the cutting edge length while maintaining the same lead angle. This increases at least cutting depth and ramping angles. This insert will be referred to herein as a "winged high-feed insert". Nonetheless, this design maintains the two parallel straight side abutment surfaces, and therefore, between the cutting portions, the insert has a narrow portion which extends, or spans across a major portion of the insert's entire longitudinal length. Furthermore, in order to balance said advantages with unwanted breakage of the winged extensions, their length must be optimized, and relatively minimal.

Figure 1A:
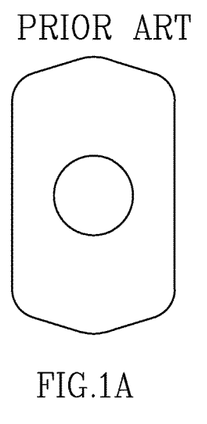
FIG. 1A is a plan view of a prior art "non-winged" high-feed insert.
Figure 1B:
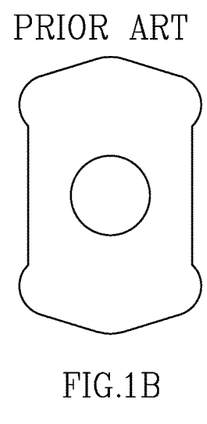
FIG. 1B is a plan view of a prior art "winged, straight-waist" high feed insert.
Figure 1C:
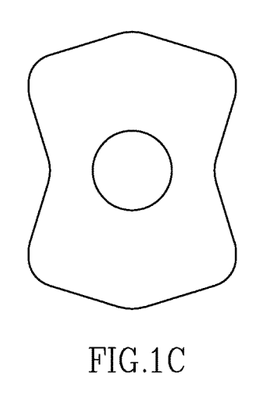
FIG. 1C is a plan view of a "tapered-waist" high feed insert, in accordance with one embodiment of the present invention.

Attention is drawn to FIGS. 1A-1C, which shows a sort of 'geometry evolution' of the inserts of the field, drawn to the same scale. FIG. 1A shows a prior art 'non-winged' insert geometry, which is similar to the insert geometry disclosed by U.S. Pat. No. 8,696,263. FIG. 1B shows a prior art 'winged insert geometry, which is similar to the insert geometry disclosed by U.S. Pat. No. 8,950,984. FIG. 1C shows what will be referred to herein as a 'tapered-waist' insert geometry according to the subject matter of the present application.

The so-called 'tapered-waist' shaped insert geometry of the current invention overcomes the aforementioned disadvantages and provides an advantageous, more robust insert which outperforms the prior art winged and non-winged insert geometries in terms of tool/insert life expectancy, depth of cut at same lead angles, plunging depth, tool ramping angles and in abutment stability in the pocket.

SUMMARY OF THE INVENTION

In accordance with a first aspect of the subject matter of the present application there is provided a double-sided indexable insert configured for high-feed or drilling operations, the insert having a 180-degree rotational symmetry about each of first, second and third axes of a three-dimensional euclidean space; the insert comprising:

opposite first and second main surfaces and a peripheral surface extending therebetween, each of the first and second main surfaces comprising a main abutment surface and at least two rake surfaces; and a through clamping bore extending along the third axis and opening out to the first and second main surfaces;

the peripheral surface comprising:

two opposite front surfaces, each comprising a pair of outward abutment surfaces; and two opposite side surfaces, each extending between the two front surfaces, each side surface comprising a pair of at least partially planar inward abutment surfaces;

wherein each pair of outwards abutment surfaces converge outwardly away from the third axis; and each pair of inward abutment surfaces converge inwardly towards the third axis.

In accordance with a second aspect of the subject matter of the present application there is provided a high-feed or drilling tool body comprising a radial pocket configured to secure a cutting insert, the radial pocket comprising:

a base abutment surface;

first and second abutment walls extending transversely away from the base abutment surface;

a pocket clamping bore opening out the base abutment surface; and an insert fastener;

wherein in a cross section of the pocket taken parallel to the base abutment surface, two straight lines respectively tangent to the first and second abutment walls form an abutment angle therebetween; and wherein the abutment angle ranges between 80 and 95 degrees.

In accordance with a third aspect of the subject matter of the present application there is provided a double-sided indexable insert designed for both milling and drilling operations, and comprising:

a longitudinal first axis, a lateral second axis perpendicular to the longitudinal first axis, and a vertical third axis perpendicular to both the longitudinal first axis and the lateral second axis, the insert having 180-degree rotational symmetry about each of the three axes;

a lateral first plane defined by the lateral second axis and the vertical third axis, a longitudinal second plane defined by the longitudinal first axis and the vertical third axis, and a median third plane defined by the longitudinal first axis and the lateral second axis;

first and second main surfaces located on opposite sides of the median third plane, each of the first and second main surfaces comprising a main abutment surface and at least two rake surfaces;

a peripheral surface extending between the first and second main surfaces; and a through clamping bore extending along the vertical third axis and opening out to the first and second main surfaces;

wherein:

the peripheral surface comprises:

two front surfaces formed on opposite sides of the lateral first plane, each front surface comprising a pair of outward abutment surfaces which converge toward the longitudinal second plane, in an outward direction of the insert; and two side surfaces formed on opposite sides of the longitudinal second plane, each side surface comprising a pair of at least partially planar inward abutment surfaces which converge towards the lateral first plane, in an inward direction of the insert, thereby providing the insert with a tapered waist in a view of the insert along the vertical third axis.

Any of the following features, either alone or in combination, may be applicable to any of the above aspects of the subject matter of the application:

Said convergence can occur at least in a cross section taken in a median third plane, defined by the first and second axes.

In each side surface, the inward abutment surfaces can be the largest surfaces.

In a cross section taken along the third plane, in each side surface, the inward abutment surfaces form straight lines which are longer than any other lines on said each side surface.

In each front surface, the outward abutment surfaces can be the largest surfaces.

Each front surface further includes a front intermediate surface which extends between the outward abutment surfaces, is intersected by the second plane, and can have a smaller area than each of the outward abutment surfaces.

The front intermediate surface can be outwardly convexly curved.

Each side surface further includes a side intermediate surface which extends between the inward abutment surfaces and can have a smaller area than each of the outward abutment surfaces.

The side intermediate surface can be outwardly concavely curved.

At the peripheral surface, only the inward and outward abutment surfaces are configured for abutment and for engaging corresponding surfaces in a pocket of a cutting tool.

The side intermediate surface is not configured for abutment in a pocket of a cutting tool.

The only surfaces on the peripheral surface configured for abutment in a pocket of a cutting tool are the inward abutment surfaces and the outward abutment surfaces.

The insert can be a negative insert, and the peripheral surface can be parallel to the third axis.

The insert can be a negative insert, and the inward and outward abutment surfaces can be parallel to the third axis.

In a cross-section taken along the third plane, the inward abutment surfaces converge in a direction which is perpendicular to the direction of convergence of the outward abutment surfaces.

Each pair of outward abutment surfaces converge outwardly along the second axis.

Each pair of inward abutment surfaces converge inwardly along the first axis.

The insert can further include four cutting portions, each of which can include:
a first corner cutting edge;
a second corner cutting edge; and
a main cutting edge which extends between the first and second corner cutting edges.

Each cutting portion further comprises a ramping cutting edge which extends from the second corner cutting edge.

In a view along the third axis of any of the first and second main surfaces, a straight line tangent to the main cutting edge forms with the second axis an acute lead angle which ranges between 9 and 23 degrees.

At least in a cross section along the median third plane, a straight line is tangent to an outward abutment surface and forms an internal abutment angle with an inward abutment surface located in a diagonally opposite quadrant of the third plane; and the abutment angle ranges between 80 and 95 degrees.

In a direction parallel to the second axis, a minimum width W1 and a maximum width W2 are defined respectively between inward-most and outward-most portions of the insert, and wherein a width ratio $R1=W1/W2$ ranges between 1.15 and 1.4.

A maximum insert length L is measured between extremities of the insert in a direction parallel to the first axis, and an inward abutment length I of the inward abutment surface is defined along the third plane; a length ratio R2 is defined between the inward abutment length I and the maximum insert length L; and the length ratio $R2=I/L$ ranges between 0.13 and 0.4.

In a view along the vertical third axis, a maximum insert length L is defined between extremities of the insert in a direction parallel to the longitudinal first axis and an inward abutment length I is defined as the inward abutment surface length as measured in a cross section along a median third plane defined by the first and second axes; a length ratio R2 is defined between the inward abutment length I and the maximum insert length L; and the length ratio $R2=I/L$ ranges between 0.13 and 0.4.

One of the insert's main abutment surfaces abuts the pocket's base abutment surface;
a first inward abutment surface on one of the side surfaces abuts the pocket's first abutment wall;
a first outward abutment surface on one of the front surfaces abuts the pocket's second abutment wall;
a second inward abutment surface on said one of the side surfaces and a second outward abutment surface on said one of the front surfaces, are located in the pocket, between the pocket's first abutment wall and the pocket's second abutment wall; and
the insert is secured to the pocket's base abutment surface by an insert fastener passing through the insert's through clamping bore and into the pocket clamping bore.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
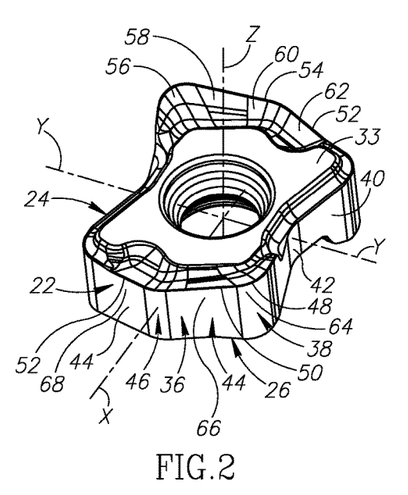
FIG. 2 is an isometric view of a first embodiment of a double-sided indexable cutting insert.
Figure 3:
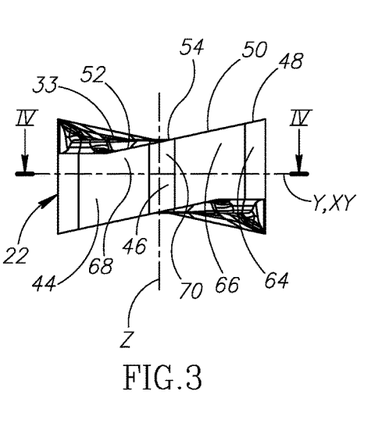
FIG. 3 is a front view of the insert of FIG. 1 along a second axis of a 3D Euclidean axis system.
Figure 7:
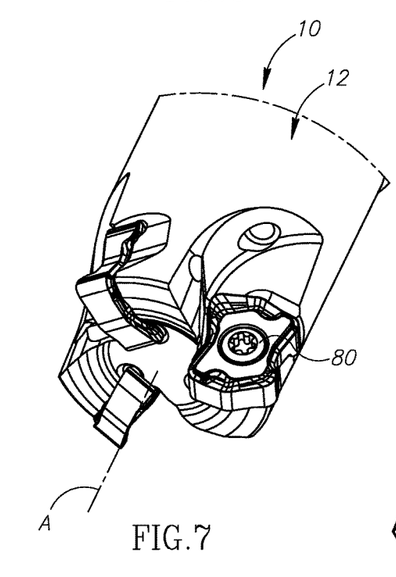
FIG. 7 is an isometric view of a high-feed milling tool with the inserts of FIG. 1 secured in pockets therein.
Figure 8:
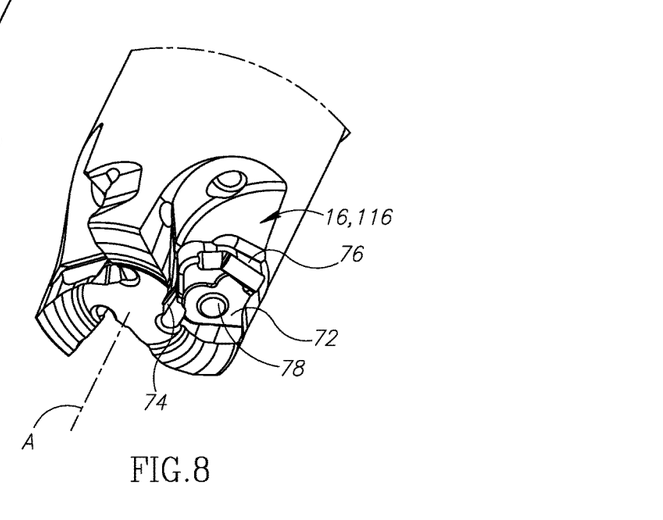
FIG. 8 is an isometric view of the milling tool of FIG. 6 with the inserts removed.

Attention is drawn to FIGS. 2 and 7. A high-feed or drilling cutting tool 10 includes a tool body 12 and at least one radial, double-sided and indexable tapered-waist cutting insert 14 secured in a pocket 16 of the tool body 12. The pockets 16 are what is known in the field as radially oriented, or radial pockets 16. The cutting tool 10 has a central longitudinal rotation axis A, about which it rotates during machining operations.

The cutting insert 14 is typically made from extremely hard and wear-resistant material such as cemented carbide by form-pressing and sintering carbide powders in a binder. The cemented carbide may be, for example, tungsten carbide. The cutting insert 14 may be coated or uncoated.

Attention is drawn to FIGS. 2-6. The insert 14 has a 180-degree rotational symmetry about each of the first, second and third axes X, Y, Z of a three-dimensional Euclidean space. As seen in FIG. 2, the X axis extends along a length dimension of the insert, and thereby serves as a longitudinal first axis. X Meanwhile, the Y axis extends along a width (or "waist") dimension of the insert, and thereby serves as a lateral second axis Y. Finally, the Z axis extends along a height dimension of the insert, and thereby serves as a vertical third axis Z. The insert 14 has a lateral first plane YZ defined by the second and third axes Y, Z, a longitudinal second plane XZ defined by the first and third axes X, Z and a median third plane XY defined by the first and second axes X, Y. The insert 14 has 180-degree rotational symmetry about each axis. Furthermore, according to the present embodiments, the insert lacks mirror symmetry about all three of the first, second and third planes.

It should be noted that in the present context, "rotational symmetry" relates at least to operational/functional machining geometry, such as cutting edges and/or surfaces of the insert 14, as will be further disclosed below. For example, some functional features such as cutting edge indication/marking numbers are not included in said rotational symmetry. Furthermore, the symmetry does not include, or relates to, non-functional features such, e.g., coloring of the insert 14.

The insert 14 has identical first and second main surfaces 18, 20 and a peripheral surface 22 which extends therebetween. The median third plane XY is midway between the first and second main surfaces 18, 20, and generally parallel thereto. Each of the first and second main surfaces 18, 20 meets the peripheral surface 22 at first and second edges 24, 26 respectively. The insert 14 includes a through clamping bore 28 which is centered about the third axis Z. The clamping bore 28 opens out to the first and second main surfaces 18, 20, and can be perpendicular to the median third plane XY.

The structure of the insert 14 (specifically the abutment surface geometry on the peripheral surface 22), as will be further discussed below, is suitable both for drilling and high feed milling machining operations.

Each of the first and second main surfaces 18, 20 can include two operative/cutting portions 30. The two cutting portions 30 on a given main surface 18, 20 are located on opposite sides of the lateral first plane YZ, each cutting portion 30 extending on both sides of the longitudinal second plane XZ. Each of the first and second main surfaces 18, 20 further includes two non-cutting, or non-operative portions 32 located on opposite sides of the longitudinal second plane XZ. Each main surface 18, 20 further includes an at least partially planar main abutment surface 33 which is located between the two cutting portions 30 and between the two non-operative portions 32. The clamping bore 28 preferably opens out to both main abutment surfaces 33.

The peripheral surface 22 includes two identical and opposite side surfaces 34 and two identical and opposite front surfaces 36, each of which extends between the two side surfaces 34. The two front surfaces 36 are formed on opposite sides of the lateral first plane YZ, each front surface 36 comprising a pair of outward abutment surfaces 44 which converge toward the longitudinal second plane XZ, in an outward direction of the insert. The two side surfaces 34 formed on opposite sides of the longitudinal second plane XZ, each side surface 34 comprising a pair of at least partially planar inward abutment surfaces 40 which converge towards the lateral first plane YZ, in an inward direction of the insert, thereby providing the insert with a tapered waist in a view of the insert along the vertical third axis Z.

Each side surface 34 is connected to a front surface 36 via a corner intermediate surface 38. The corner intermediate surface 38 is preferably smaller than any of the front or side surfaces 36, 34. The two side surfaces 34 are located at opposite sides of the longitudinal second plane XZ. The two front surfaces 36 are located at opposite sides of the lateral first plane YZ.

Figure 4:
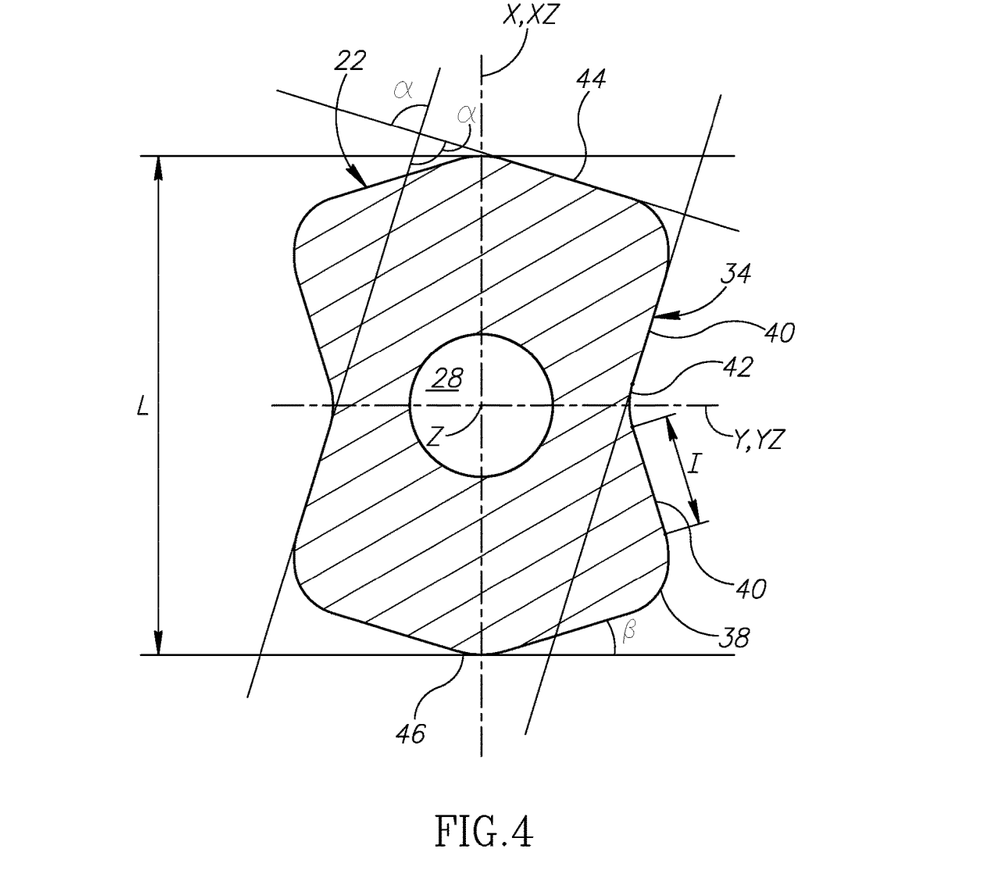
FIG. 4 is a cross-sectional view of the insert taken along the line IV-IV of FIG. 3.
Figure 5:
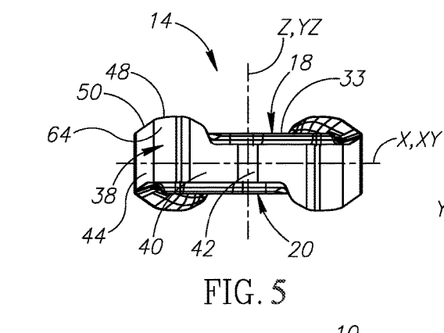
FIG. 5 is a side view of the insert of FIG. 1 along a first axis of the 3D Euclidean axis system.

Attention is drawn to FIGS. 2-6. Each side surface 34 includes two identical inward abutment surfaces 40. According to the present embodiments, at least in a cross section along the median third plane XY, and as seen in FIG. 4, each pair of adjacent inward abutment surfaces 40 converge in an inward direction of the insert, towards the third axis Z. Put differently, each pair of adjacent inward abutment surfaces 40 converge towards the lateral first plane YZ, thereby resulting in a tapered waist. According to the present embodiment, the insert 14 is a so-called negative-insert, and therefore this convergence is viewable also from a plan view of any of the first and second main surfaces 18, 20. The inward convergence in such a tapered-waist insert (as seen at least in FIGS. 1C, 4 and 6), enables a more robust, superior design, compared to previously known inserts of the field. Compared to non-winged inserts of the field, or to small winged inserts, the disadvantage of this geometry, however, is an increase in mass, volume and possibly production costs. Furthermore, this convergence enables a preferred abutment angle range, as will be further explained below. The inward abutment surfaces 40 are at least partially planar. According to the present embodiments, the inward abutment surfaces 40 are planar at least at the median third plane XY, and thereby form a straight line in a cross section along the median third plane XY, as seen in FIG. 4.

Each side surface 34 includes a side intermediate surface 42 which extends between the inward abutment surfaces 40. The side intermediate surface 42 can have a concavely curved shape, as seen in the FIG. 4 cross section along the median third plane XY. The side intermediate surface 42 is neither suitable nor configured for abutment. According to the present example, in order to provide for a proper abutment and room for abutment at the side surfaces 34, the side intermediate surface 42 are preferably smaller than the inward abutment surfaces 40 either in terms of area size, or in length, in a cross section along the median third plane XY. Furthermore, according to the present examples, at least in the cross section along the median third plane XY, the inward abutment surface 40 is preferably the largest surface in each side surface 34.

According to the present embodiments, the insert is a negative insert, and therefore in the median third plane XY, an inward abutment length I can be easily measured between each side intermediate surface 42 and corner intermediate surface 38. Similarly, and also in the median third plane XY, a maximum insert length L can be measured between extremities of the insert in a direction parallel to the first axis X. For the most part, the maximum insert length L is similar between high-feed inserts of similar size, and/or high-feed inserts with the same clamping bore diameter (and same fastener size), as shown in FIGS. 1-1C. An abutment length ratio R2=I/L is defined between the inward abutment length I and the maximum insert length L. The abutment length ratio R2=I/L is less than 0.4. The abutment length ratio R2=I/L preferably ranges between 0.13 and 0.4. The abutment length ratio R2 relates directly to proportions of the insert, and therefore to the advantages derived from the converging inward abutment surfaces 40.

Figure 6:
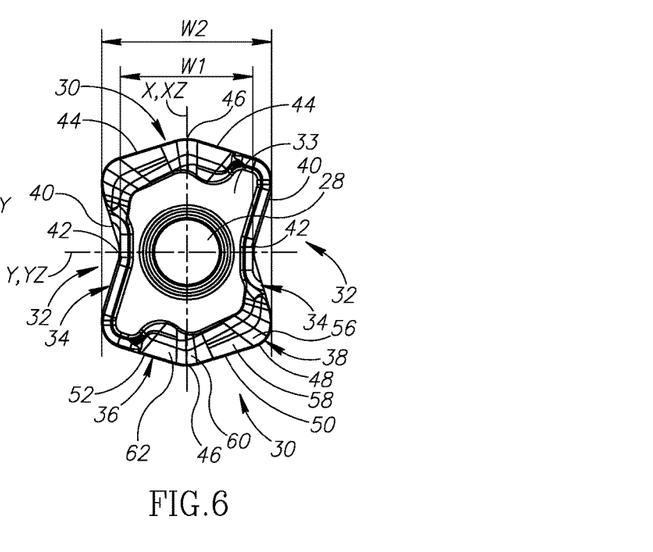
FIG. 6 is a plan view of a main surface of the insert of FIG. 1 along a third axis of the 3D Euclidean axis system.

Attention is drawn to FIG. 6. In a view along the vertical third axis Z, a minimum insert width W1 is defined between inward-most portions of the insert 14, 114, 214, in a direction parallel to the lateral second axis Y. Furthermore, a maximum insert width W2 is defined between outward-most portions of the insert 14, 114, 214, in a direction parallel to the lateral second axis Y. According to the advantageous design of the current invention, a width ratio R1=W2/W1 ranges between 1.15 and 1.4. A width ratio R1 in this range helps promote a more robust, wider/larger cutting portion, with a more stable securement in the pocket, while still remaining compact (the minimum insert width W1 is similar, if not equal to, prior art inserts with similar clamping bore diameter and/or size).

Each front surface 36 includes two identical outward abutment surfaces 44. The outward abutment surfaces 44 are preferably planar. At least in a cross section along the median third plane XY, each pair of adjacent outward abutment surfaces 44 converge outwardly, and towards the longitudinal second plane XZ. Stated differently, each pair of adjacent outward abutment surfaces 44 converge outwardly in a direction away from the vertical third axis Z. According to the present embodiments, the insert 14 is a negative insert, and therefore the convergence is viewable from a plan view (along the vertical third axis Z) of any of the first and second main surfaces 18, 20.

Figure 16:
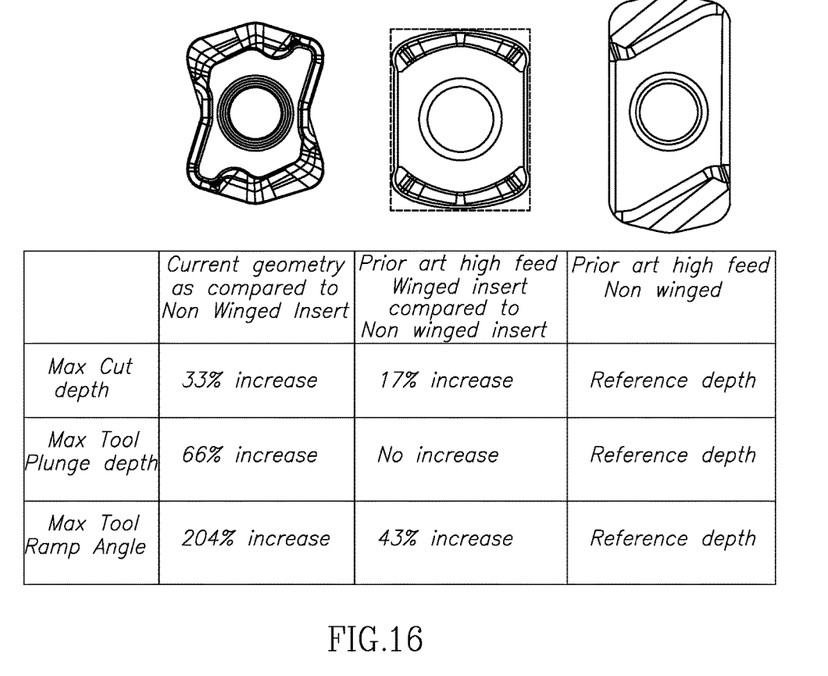
FIG. 16 is a table showing machining test results for three high-feed milling tools with the same diameter and number of pockets, and each having a different insert geometry.

Attention is drawn to FIGS. 4 and 6. At least in the cross section along the median third plane XY, each outward abutment surface 44 forms an internal abutment angle α with an inward abutment surface 40 located in a diagonally opposite quadrant of the median third plane XY (as seen in FIG. 4). The abutment angle α ranges between 80 and 95 degrees. According to the present, preferable embodiments, the abutment angle α equals 90 degrees. According to machining tests performed on cutting tools with inserts based on the current design, it was found that the above abutment angle range is very stable, which can be directly linked to the increase in tool life as shown in the table of FIG. 16.

Each front surface 36 can include a front intermediate surface 46 which extends between the two outward abutment surfaces 44. The front intermediate surface 46 can have an outwardly convexly curved shape. The front intermediate surface 46 is not suitable for abutment. In order to allow more room for a proper abutment at the front surfaces 36, the front intermediate surface 46 is preferably smaller than the outward abutment surfaces 44 either in terms of area size, and/or in length measured in a cross section along the third plane XY. Furthermore, according to the present embodiments, in the cross section along the median third plane XY, the outward abutment surface 44 is the largest surface in each front surface 36. When proceeding along the peripheral surface 22, each outward abutment 44 surface is located between an adjacent outward abutment surface 44 and an inward abutment surface 40.

Attention is drawn to FIGS. 2-6. According to a first embodiment, the insert 114 is a milling insert 114, and specifically a fast feed, or high feed milling insert 114.

According to the first embodiment, each cutting portion 30 includes a first corner cutting edge 48 connected to a main cutting edge 50, a ramping cutting edge 52 and a second corner cutting edge 54 which extends between the main cutting edge 50 and the ramping cutting edge 52. As seen in the FIG. 3 side view of the insert along the lateral second axis Y, each first corner cutting edge 48 is located outwardly above/beyond the adjacent main abutment surface 33, in a direction along the vertical third axis Z. Furthermore, in the vertical third axis Z direction, each first corner cutting edge 48 is located outwardly farthest from the adjacent main abutment surface 33 compared to the other cutting edges.

Figure 11:
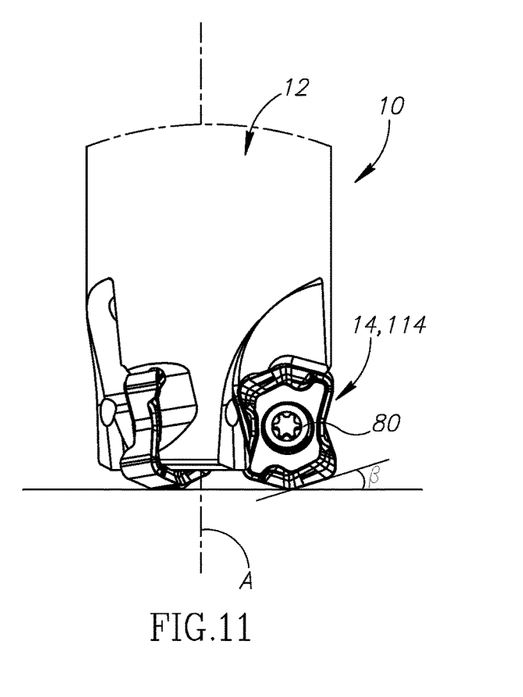
FIG. 11 is a side view, perpendicular to an axis of rotation of the milling tool of FIG. 6.
Figure 12:
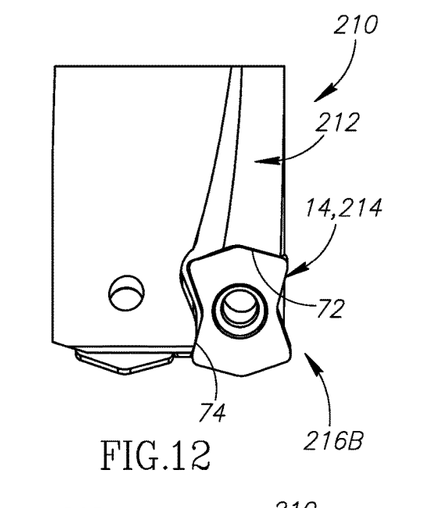
FIG. 12 is a side view of a drilling tool having inserts according to a second embodiment, and showing an insert secured in an internal drill pocket.
Figure 13:
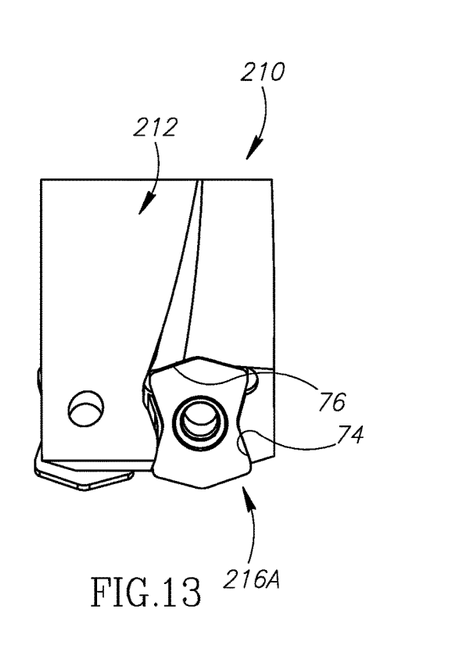
FIG. 13 is another side view of the drilling tool of FIG. 11, showing an insert secured in an external drill pocket.

As seen in the cross section of FIG. 4, in a view along the vertical third axis Z of any of the first and second main surfaces 18, 20, a straight line (in the current example, the straight line is collinear with the main cutting edge 50) tangent to the main cutting edge 50 forms with the lateral second axis Y an acute lead angle β which ranges between 9 and 23 degrees. Preferably, the lead angle β ranges between 16 and 18 degrees. Even preferably, the lead angle β is 17 degrees. It is noted that although the current lead angle β is defined solely by insert geometry, 'true' lead angles (measured with respect to a workpiece, as shown in FIG. 11) can shift by about 1-3 degrees, depending on the orientation of the insert 14 in the cutting tool 10 (which provides relief for the opposite cutting portion—as known in the field).

According to the first embodiment, each cutting portion 30 further includes a first corner rake surface 56, a main rake surface 58, a second corner rake surface 60 and a ramping rake surface 62. The first corner rake surface 56 extends from the first corner cutting edge 48 and is connected to the main rake surface 58. The main rake surface 58 extends from the main cutting edge 50. The ramping rake surface 62 extends from the ramping cutting edge 52. The second corner rake surface 60 extends from the second corner cutting edge 54 and extends between the main rake surface 58 and the ramping rake surface 62.

Adjacent, and 'behind' each cutting portion 30, the peripheral surface 22 includes relief surfaces respective of, or associated with, each cutting edge. A first corner relief surface 64 extends from the first corner cutting edge 48 and connects with a main relief surface 66. The main relief surface 66 extends from the main cutting edge 50. A ramping relief surface 68 extends from the ramping cutting edge 52. A second corner relief surface 70 extends from the second corner cutting edge 54 and between the main relief surface 66 and the ramping relief surface 68.

Attention is drawn to FIGS. 12-15. According to a second embodiment, the insert 14 is a drilling insert 214. The names of the ramping cutting edge 52, ramping rake surface 62 and ramping relief surface 68 of the feed insert 114 will be referred to, respectively, as secondary cutting edge 52, secondary rake surface 62 and secondary relief surface 68 with reference to the drilling insert 214.

Attention is drawn to FIGS. 7-11. According to the first embodiment, the high-feed insert 114 is secured in a feed pocket 116 of the high-feed, or milling, tool body 112. The milling tool body 112 can include three identical feed pockets 116. The feed pockets 116 may be symmetrically arranged with respect to the rotation axis A (i.e., be rotationally spaced apart from one another by 120°). All the feed pockets 116 may also be located at the same radial distance from the rotation axis A.

Figure 9:
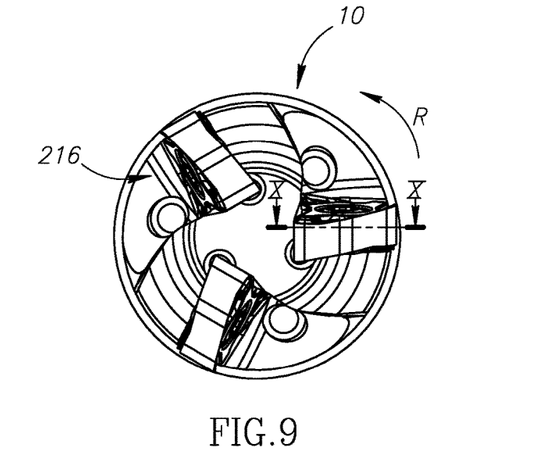
FIG. 9 is a bottom view along the axis of rotation of the milling tool of FIG. 6.
Figure 10:
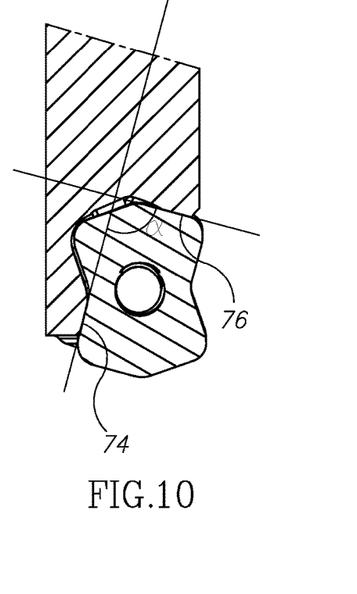
FIG. 10 is a cross-sectional view of the milling tool taken along line X-X of FIG. 9.

Each feed pocket 116 includes a base abutment surface 72 and first and second abutment walls 74, 76. The feed pocket further includes a pocket clamping bore 78 which opens out to the base abutment surface 72 and an insert fastener 80, preferably a screw, which is screw threaded into the pocket clamping bore 78. The base abutment surface 72 faces in a rotation direction R about the rotation axis A (FIG. 9). The abutment walls 74, 76 extend transversely to the base abutment surface 72. In the present examples, the inserts 114, 214 are negative inserts, and therefore the abutment walls 74, 76 are at least partially planar, and perpendicular to the base abutment surface 72.

The first abutment wall 74 faces outwardly away from the rotation axis A. The second abutment wall 76 faces transversely to the first abutment wall 74. At least in a cross section taken parallel to the base abutment surface 72, the first and second abutment walls 74, 76 form an angle which is similar to the abutment angle α.

Attention is again drawn to FIGS. 12-15. According to the second embodiment, the drilling insert 214 is secured in a drill pocket 216 of a drilling tool body 212 of a drilling tool 210. The drilling tool body 212 can include two drill pockets 216 located on opposite sides of the rotation axis A. One of the drill pockets 216 is located closer to the rotation axis and will be referred to herein as an internal drill pocket 216A. The other drill pocket 216 will be referred to herein as an external drill pocket 216B.

Figure 14:
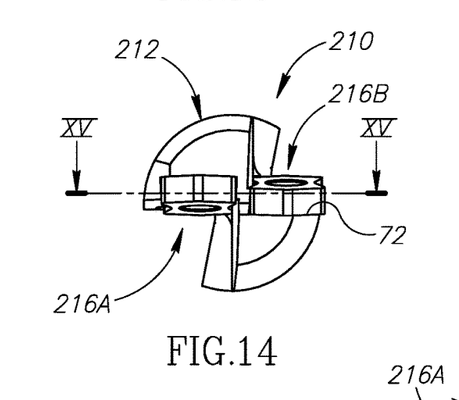
FIG. 14 is a bottom view along the axis of rotation of the drilling tool of FIG. 11.
Figure 15:
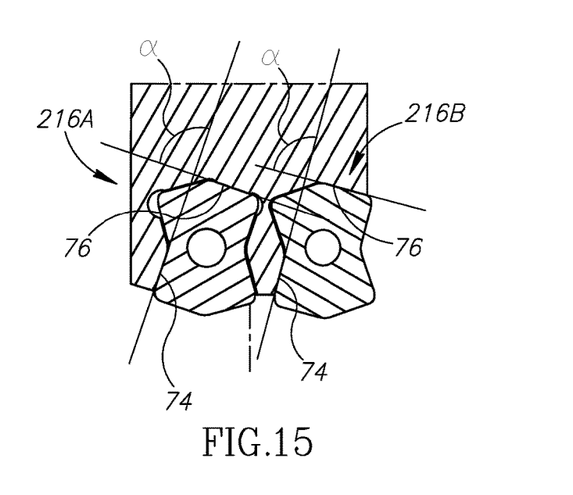
FIG. 15 is a cross-sectional view of the drilling tool taken along line XV-XV of FIG. 13.

Each drill pocket 216 includes a base abutment surface 72 and first and second abutment walls 74, 76. The drill pocket 216 further includes a pocket clamping bore 78 which opens out the base abutment surface 72 and an insert fastener 80, preferably a screw, which is screw threaded into the pocket clamping bore 78. The base abutment surface 72 faces in a rotation direction R about the rotation axis A (FIG. 14). The abutment walls 74, 76 extend transversely to the base abutment surface 72. In the present examples, the drilling inserts 214 are negative inserts, and therefore the abutment walls 74, 76 are at least partially planar, and perpendicular to the base abutment surface 72.

In the external drill pocket 216B, the first abutment wall 74 faces outwardly away from the rotation axis A. In the internal drill pocket 216A, the first abutment wall 74 faces inwardly, towards the rotation axis A. In both the internal and external drill pockets 216A, 216B, the second abutment wall 76 faces transversely to the first abutment wall 74. At least in a cross section (FIG. 15) taken parallel to the base abutment surface 72, the first and second abutment walls 74, 76 form an angle which is, within production tolerances, equal to the abutment angle α and has the same range. According to the present, preferable embodiments, the abutment angle α equals 90 degrees.

When the insert is positioned in any of the above pockets, one of the insert's main abutment surfaces 33 abuts the pocket's base abutment surface 72; a first inward abutment surface 40 on one of the side surfaces 34 abuts the pocket's first abutment wall 74; a first outward abutment surface 44 on one of the front surfaces 36 abuts the pocket's second abutment wall 76. Also, a second inward abutment surface 40 on said one of the side surfaces 34 and a second outward abutment surface 44 on said one of the front surfaces 36, are located in the pocket, between the pocket's first abutment wall 74 and the pocket's second abutment wall 76. Finally, the secured to the pocket's base abutment surface 72 by an insert fastener 80 passing through the insert's through clamping bore 28 and into the pocket clamping bore 78.

What is claimed is:

1. A double-sided indexable insert (14, 114, 214) configured for high-feed or drilling operations, the insert (14, 114, 214) having a 180-degree rotational symmetry about each of the longitudinal first axis (X), lateral second (Y) and vertical third axis (Z) of a three-dimensional euclidean space; the insert (14, 114, 214) comprising:
   opposite first and second main surfaces (18, 20) and a peripheral surface (22) extending therebetween, each of the first and second main surfaces (18, 20) comprising a main abutment surface (33) and at least two rake surfaces (58); and
   a through clamping bore (28) extending along the third axis (Z) and opening out to the first and second main surfaces (18, 20);
   the peripheral surface (22) comprising:
   two opposite front surfaces (36), each comprising a pair of outward abutment surfaces (44); and
   two opposite side surfaces (34), each extending between the two front surfaces (36), each side surface (34) comprising a pair of at least partially planar inward abutment surfaces (40); wherein
   each pair of outward abutment surfaces (44) converge outwardly away from the third axis (Z);
   each pair of inward abutment surfaces (40) converge inwardly towards the third axis (Z); and
   the converging inward abutment surfaces (40) on the opposite side surfaces (34) provide the insert with a tapered waist, in a view of the insert along the vertical third axis (Z).

2. The insert (14, 114, 214) according to claim 1, wherein said convergence occurs at least in a cross section taken in a median third plane (XY) defined by the first and second axes (X, Y).

3. The insert (14, 114, 214) according to claim 1, wherein in each side surface (34), the inward abutment surfaces (40) are the largest surfaces.

4. The insert (14, 114, 214) according to claim 1, wherein in a cross section taken along a median third plane (XY) defined by the first and second axes (X, Y), the inward abutment surfaces (40) on each side surface (34) form straight lines which are longer than any other lines on said each side surface (34).

5. The insert (14, 114, 214) according to claim 1, wherein in each front surface (36) the outward abutment surfaces (44) are the largest surfaces.

6. The insert (14, 114, 214) according to claim 1, wherein each front surface (36) further comprises a front intermediate surface (46) which extends between the outward abutment surfaces (44), is intersected by a longitudinal second plane (XZ) defined by the first and third axes (X, Z), and has a smaller area than each of the outward abutment surfaces (44).

7. The insert (14, 114, 214) according to claim 6, wherein the front intermediate surface (46) is outwardly convexly curved.

8. The insert (14, 114, 214) according to claim 1, wherein each side surface (34) further comprises a side intermediate surface (42) which extends between the inward abutment surfaces (40), is intersected by a lateral first plane (YZ) defined by the second and third axes (Y, Z), and has a smaller area than each of the inward abutment surfaces (44).

9. The insert (14, 114, 214) according to claim 8, wherein the side intermediate surface (42) is outwardly concavely curved.

10. The insert (14, 114, 214) according to claim 8, wherein the side intermediate surface (42) is not configured for abutment in a pocket (16, 116, 216) of a cutting tool (10).

11. The insert (14, 114, 214) according to claim 1, wherein the only surfaces on the peripheral surface (22) configured for abutment in a pocket (16, 116, 216) of a cutting tool (10) are the inward abutment surfaces (40) and the outward abutment surfaces (44).

12. The insert (14, 114, 214) according to claim 1, wherein the insert (14, 114, 214) is a negative insert, and the peripheral surface (22) is parallel to the vertical third axis (Z).

13. The insert (14, 114, 214) according to claim 1, wherein the insert (14, 114, 214) is a negative insert, and the inward and outward abutment surfaces (40, 44) are parallel to the vertical third axis (Z).

14. The insert (14, 114, 214) according to claim 1, wherein in a cross-section taken along a median third plane (XY) defined by the first and second axes (X, Y), the inward abutment surfaces (40) converge in a direction which is perpendicular to the direction of convergence of the outward abutment surfaces (44).

15. The insert (14, 114, 214) according to claim 1, wherein each pair of outward abutment surfaces (44) on a front surface (36) converge outwardly along the second axis (Y).

16. The insert (14, 114, 214) according to claim 1, wherein each pair of inward abutment surfaces (40) on a side surface (34) converge inwardly along the first axis (X).

17. The insert (14, 114, 214) according to claim 1, wherein the insert (14, 114, 214) further comprises four cutting portions (30), each of which comprises:

a first corner cutting edge (48);
a second corner cutting edge (54); and
a main cutting edge (50) which extends between the first and second corner cutting edges (48, 54).

18. The insert (14, 114, 214) according to claim 17, wherein each cutting portion (30) further comprises a ramping cutting edge (52) which extends from the second corner cutting edge (54).

19. The insert (14, 114, 214) according to claim 17, wherein in a view along the vertical third axis (Z) of any of the first and second main surfaces (18, 20), a straight line tangent to the main cutting edge (50) forms with the lateral second axis (Y) an acute lead angle ($\beta$) which ranges between 9 and 23 degrees.

20. The insert (14, 114, 214) according to claim 1, wherein:
at least in a cross section along a median third plane (XY) defined by the first and second axes (X, Y), each outward abutment surface (44) is straight, and forms an internal abutment angle ($\alpha$) with an inward abutment surface (40) located in a diagonally opposite quadrant of said cross section; and
the abutment angle ($\alpha$) ranges between 80 and 95 degrees.

21. The insert (14, 114, 214) according to claim 1, wherein:
in a direction parallel to the lateral second axis (Y), the insert has a minimum width W1 at inward-most portions thereof, and a maximum width W2 at outward-most portions thereof; and
a width ratio R1=W1/W2 ranges between 1.15 and 1.4.

22. The insert (14, 114, 214) according to claim 1, wherein:
in a cross-section along a median third plane (XY) defined by the first and second axes (X, Y), the insert has a maximum insert length L measured in a direction parallel to the longitudinal first axis (X);
in said cross-section along the median third plane (XY), each inward abutment surface (40) has an inward abutment length I; and
a length ratio R2=I/L ranges between 0.13 and 0.4.

23. The insert (14, 114, 214) according to claim 1, wherein:
in a view along the vertical third direction (Z), the insert has a maximum insert length L defined between extremities of the insert in a direction parallel to the longitudinal first axis (X);
in a cross-section along a median third plane (XY) defined by the first and second axes (X, Y), each inward abutment surface (40) has an inward abutment length I; and
a length ratio R2=I/L ranges between 0.13 and 0.4.

24. A high-feed or drilling tool (10, 210) having a longitudinal rotation axis (A), and comprising:
a tool body (12, 112, 212); and
a cutting insert (14, 114, 214) according to claim 1 secured in the tool body.

25. The tool (10, 210) according to claim 24, wherein:
the tool body (12, 112, 212) has a radial pocket (16, 116, 216) comprising:
a base abutment surface (72);
first and second abutment walls (74, 76) which extend transversely away from the base abutment surface (72); and
a pocket clamping bore (78) which opens out to the base abutment surface (72); and
in a cross section of the radial pocket (16, 116, 216) taken parallel to the base abutment surface (72), two straight lines respectively tangent to the first and second abutment walls (74, 76) form an abutment angle (a) therebetween, the abutment angle (a) ranging between 80 and 95 degrees.

26. The tool (10, 210) according to claim 25, wherein:

one of the insert's main abutment surfaces (33) abuts the pocket's base abutment surface (72);

a first inward abutment surface (40) on one of the side surfaces (34) abuts the pocket's first abutment wall (74);

a first outward abutment surface (44) on one of the front surfaces (36) abuts the pocket's second abutment wall (76);

a second inward abutment surface (40) on said one of the side surfaces (34) and a second outward abutment surface (44) on said one of the front surfaces (36), are located in the pocket, between the pocket's first abutment wall (74) and the pocket's second abutment wall (76); and the insert is secured to the pocket's base abutment surface (72) by an insert fastener (80) passing through the insert's through clamping bore (28) and into the pocket clamping bore (78).

\* \* \* \* \*